No. 779,514.　　　　　　　　　　　　　PATENTED JAN. 10, 1905.
O. J. ZIEGLER.
WIND WHEEL FOR WINDMILLS.
APPLICATION FILED APR. 29, 1904.
3 SHEETS—SHEET 2.
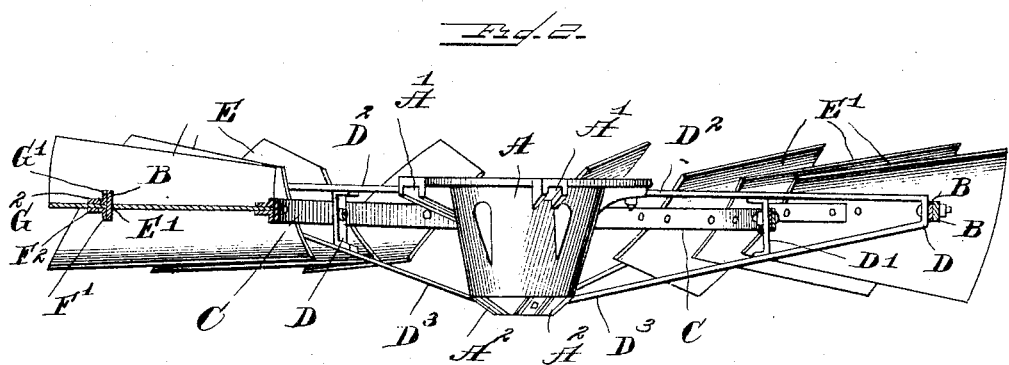
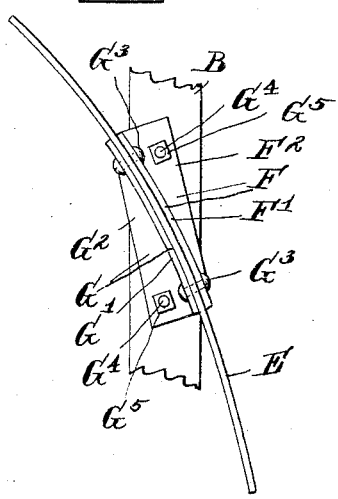
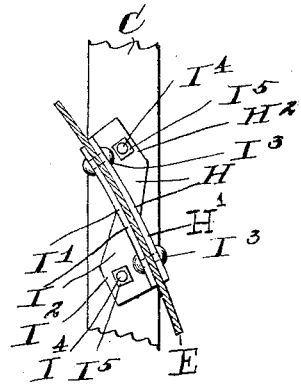
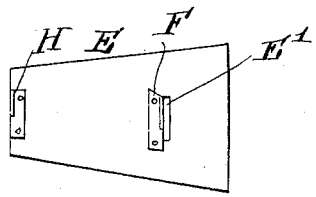
Witnesses
Inventor
Oscar J. Ziegler,
By
Atty

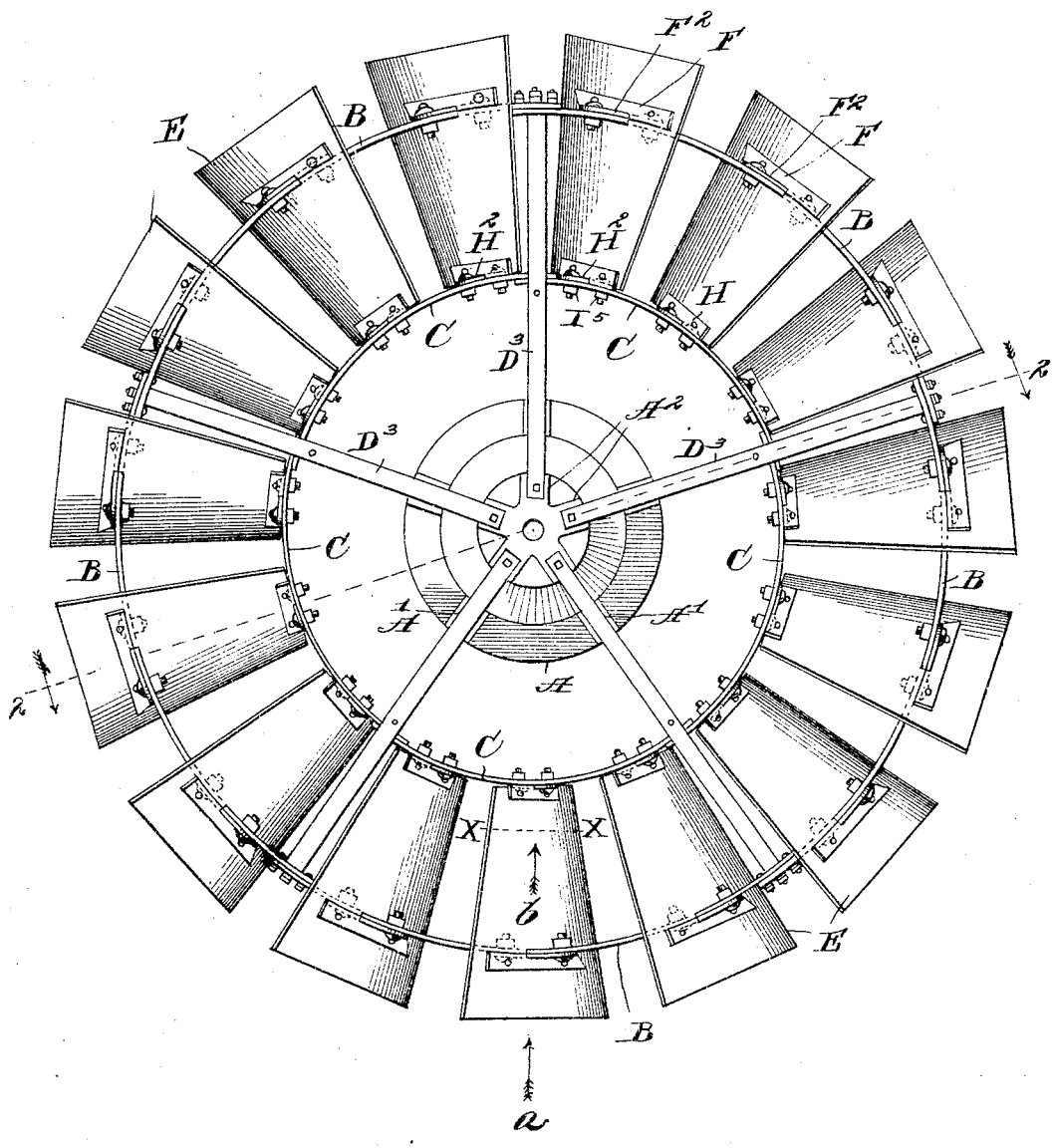

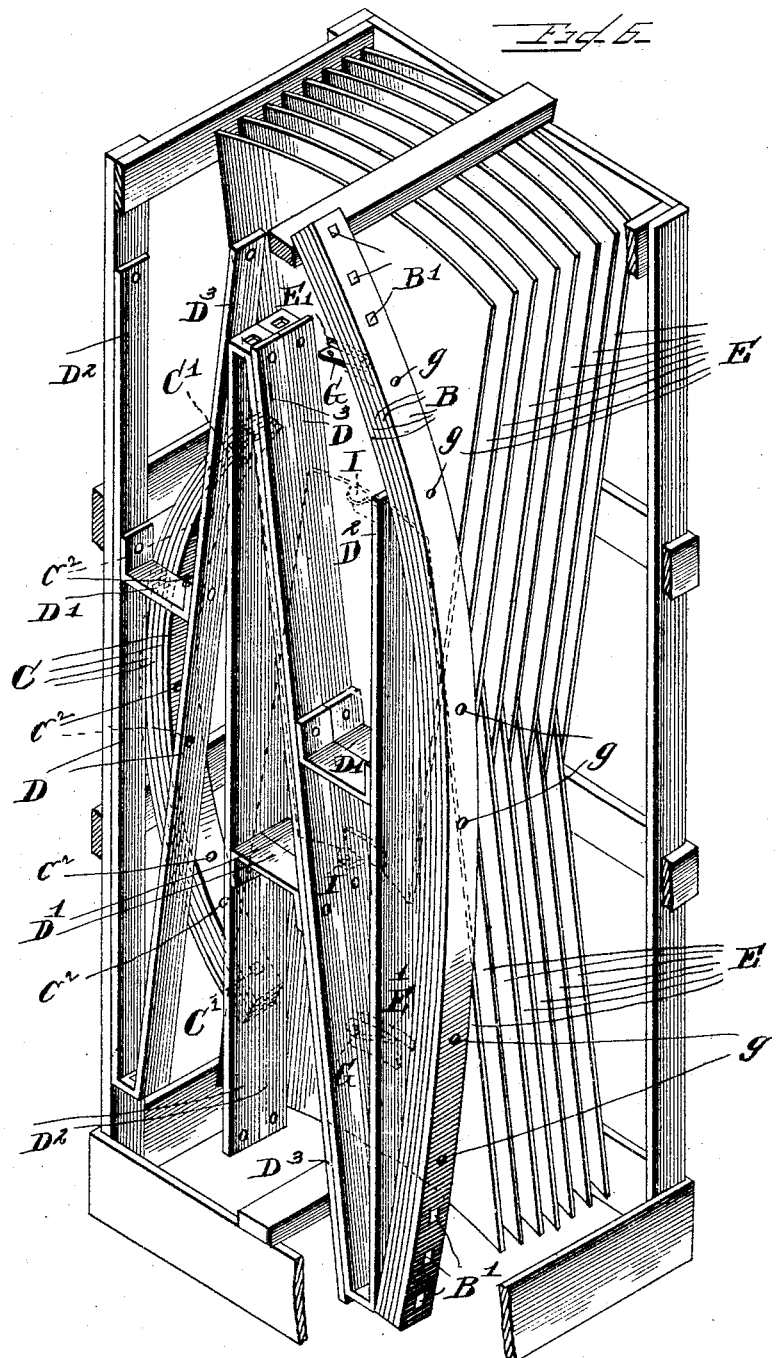

No. 779,514.

Patented January 10, 1905.

UNITED STATES PATENT OFFICE.

OSCAR J. ZIEGLER, OF FREEPORT, ILLINOIS.

WIND-WHEEL FOR WINDMILLS.

SPECIFICATION forming part of Letters Patent No. 779,514, dated January 10, 1905.

Application filed April 29, 1904. Serial No. 205,439.

*To all whom it may concern:*

Be it known that I, OSCAR J. ZIEGLER, a citizen of the United States of America, residing at Freeport, in the county of Stephenson and State of Illinois, have invented certain new and useful Improvements in Wind-Wheels for Windmills, of which the following is a specification.

This invention has for its object the production of a light strong wind-wheel constructed entirely of metal that can be packed and shipped in knockdown, so as to occupy but about one-fifth of the space required for the wheel when its parts are assembled and secured together; and it consists of certain new and useful features of construction and combinations of parts especially devised to those ends, all as hereinafter fully described, and specifically pointed out in the claims.

Referring to the accompanying drawings, which form a part of this specification, Figure 1 is an elevation of a wind-wheel embodying my invention, the small end of its hub projecting toward the observer. Fig. 2 is a partial section at the dotted line 2 in Fig. 1 of parts there shown. Fig. 3 is a view of the outer end of one of the wheel-bats as seen from *a* in Fig. 1, with a segment of the outer rim of the wheel passed therethrough and secured thereto by means of angle-clips. Fig. 4 is a view of a wheel-bat as seen from *b* in Fig. 1, sectioned at the dotted line X thereon and having its inner end secured to the periphery of the inner rim of the wheel by means of angle-clips. Fig. 5 is a view of a bat detached from its wheel. Fig. 6 is a view of the wheel, minus its hub, in knockdown and compactly crated ready for shipment.

Like letters of reference indicate corresponding parts throughout the several views.

A is a hub having radial semimortises $A'$ $A^2$ formed therein to receive the inner ends of the spokes of the wheel.

B represents sections of the outer rim of the wheel and are curved in form of segments of a circle and have three bolt-holes $B'$, extending transversely through the end portions of each thereof. The bolt-holes $B'$ in every section B register with the corresponding holes $B'$ in all of the other sections.

C represents sections of the inner rim of the wheel and are curved in form of segments of a circle of less diameter than the rim formed by the sections B and have bolt-holes $C'$ $C^2$, extending transversely through the end portions of each thereof, the holes $C'$ being for the bolts that secure the sections C together and to the spokes of the wheel and the holes $C^2$ for the bolts that secure the inner ends of the wheel-bats to the inner wheel-rim.

D represents furcated spokes having transverse double knees $D'$, connecting and securing their furcations $D^2$ $D^3$ together.

E represents the bats of the wheel, and each thereof has a transverse slot $E'$ therein for the admission therethrough of the outer wheel-rim.

F represents angle-clips having one leaf $F'$ conformed to the outer curved surface of the bats E and its outer leaf $F^2$ conformed to the periphery of the outer wheel-rim B.

G represents angle-clips having one leaf $G'$ thereof conformed to the inner curved surface of the bats E and its other leaf $G^2$ conformed to the periphery of the outer wheel-rim B.

The leaves $F'$ $G'$ of the angle-clips F G are applied and permanently secured to the opposite sides of the bats E by means of rivets $G^3$, as clearly shown in Fig. 3. The leaves $F^2$ $G^2$ of the angle-clips F G are each provided with a bolt-hole registering with corresponding holes $g$ in the outer wheel-rim B.

$G^4$ $G^5$ are bolts and nuts for securing the leaves $F^2$ $G^2$ of the clips F G to the outer wheel-rim B.

H represents angle-clips, having one leaf $H'$ thereof conformed to the outer curved surface of the inner end portion of the bats E and its other leaf $H^2$ conformed to the periphery of the inner wheel-rim C.

I represents angle-clips, having one leaf $I'$ thereof conformed to the inner curved surface of the inner end portion of the bats E and its other leaf $I^2$ conformed to the periphery of the inner wheel-rim C.

The leaves $H'$ $I'$ of the clips H I are applied and permanently secured to the opposite sides of the inner end portions of the bats E by means of rivets $I^3$, as clearly shown in Fig. 4. The leaves $H^2\ I^2$ of the clips H I are each provided with a bolt-hole registering with the holes $C^2$ in the inner wheel-rim C.

$I^4\ I^5$ are bolts and nuts for securing the leaves $H^2\ I^2$ of the clips H I to the inner wheel-rim C.

To put the parts of the wheel together, the inner ends of the spokes D are bolted into the semimortises $A'\ A^2$ in the hub A. The sections of the inner rim C are next bolted together and to the bents $D'$ of the spokes D. The inner ends of the bats E are then connected with and bolted to the inner rim C. The sections of the outer rim B are next inserted through, connected with, and bolted to the bats E, and are thereafter bolted together and to the outer ends of the spokes D.

The parts of the wheel, less the hub, are shown assembled and crated ready for shipment in Fig. 6.

Wind-wheels of the construction herein shown are adapted for shipment abroad, for which freight charges are based on the cubic space occupied by the articles shipped.

What I claim as new, and desire to secure by Letters Patent, is—

In a wind-wheel for windmills, in combination, a hub A, furcated spokes D, having their furcations $D^2\ D^3$ connected and secured together, by means of double knees $D'$, and to the hub A by their furcated ends, a circular inner rim, formed of curved sections C secured together and to the double knees $D'$ of the spokes D, radially-arranged bats E having transverse slots $E'$ therein, angle-clips H, each having one leaf $H'$ conformed to the outer curved surface of the inner end portion of one of the bats E, and its other leaf $H^2$ conformed to the periphery of the inner wheel-rim C, angle-clips I, each having one leaf $I'$ conformed to the inner curved surface of the inner end portion of one of the bats E, and its other leaf $I^2$ conformed to the periphery of the inner wheel-rim C, a circular outer rim formed of curved sections B passed through the transverse slots $E'$ in the bats E, angle-clips F, each having one leaf $F'$ conformed to the outer curved surface of one of the bats E, and its other leaf $F^2$ conformed to the periphery of the outer wheel-rim B, angle-clips G, each having one leaf $G'$ conformed to the inner curved surface of one of the bats E, and its other leaf $G^2$ conformed to the periphery of the outer wheel-rim B, and means for securing all of said parts together, substantially as described and for the purpose specified.

In testimony whereof I have signed my name to this specification in the presence of two subscribing witnesses.

OSCAR J. ZIEGLER.

Witnesses:
   JAS. W. DUNLOP,
   L. HUGHES.